US009940317B2

(12) United States Patent
Walker

(10) Patent No.: US 9,940,317 B2
(45) Date of Patent: *Apr. 10, 2018

(54) SENTENCE PARSING CORRECTION SYSTEM

(71) Applicant: Walker Reading Technologies, Inc., Rochester, MN (US)

(72) Inventor: Randall C. Walker, Rochester, MN (US)

(73) Assignee: Walker Reading Technologies, Inc., Rochester, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,213

(22) Filed: Jul. 12, 2016

(65) Prior Publication Data
US 2017/0011019 A1     Jan. 12, 2017

Related U.S. Application Data

(63) Continuation of application No. 14/438,311, filed as application No. PCT/US2013/066635 on Oct. 24, 2013, now Pat. No. 9,390,080.
(Continued)

(51) Int. Cl.
*G06F 17/27*    (2006.01)
*G06F 17/24*    (2006.01)
(Continued)

(52) U.S. Cl.
CPC ............ *G06F 17/24* (2013.01); *G06F 3/0481* (2013.01); *G06F 17/212* (2013.01); *G06F 17/22* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 4,864,502 A  *   9/1989   Kucera ................. G06F 17/274
                                                     704/8
4,887,212 A  *   12/1989   Zamora ............... G06F 17/2705
                                                     704/8
(Continued)

FOREIGN PATENT DOCUMENTS

CN              1119755        8/2003
CN            101599915       12/2009
(Continued)

OTHER PUBLICATIONS

Bird, NLTK: the natural language toolkit, 2006, ACL, Proceedings of the COLING/ACL on Interactive presentation sessions, pp. 69-72.*
(Continued)

*Primary Examiner* — Lamont Spooner
(74) *Attorney, Agent, or Firm* — Dicke, Billig & Czaja, PLLC

(57) ABSTRACT

A system provides on a computer display screen, a graphical image of an initial parsing as generated by a computerized algorithm. Individual clauses are encased in expandable containers that a user can shift and resize on the screen using a mouse or other cursor control device to thereby improve the initial parsing.

23 Claims, 5 Drawing Sheets

Related U.S. Application Data

(60) Provisional application No. 61/718,553, filed on Oct. 25, 2012.

(51) Int. Cl.
*G06F 17/21* (2006.01)
*G06F 17/22* (2006.01)
*G06F 3/0481* (2013.01)

(52) U.S. Cl.
CPC ........ *G06F 17/274* (2013.01); *G06F 17/2705* (2013.01); *G06F 17/2775* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................... 704/1, 9, 10
See application file for complete search history.

(56) References Cited

U.S. PATENT DOCUMENTS

| | | | | |
|---|---|---|---|---|
| 4,914,590 A * | 4/1990 | Loatman | ............... | G06F 17/279 704/8 |
| 5,418,717 A * | 5/1995 | Su | ............... | G06F 17/2715 704/9 |
| 5,475,588 A * | 12/1995 | Schabes | ............... | G06F 17/274 704/9 |
| 5,920,836 A | 7/1999 | Gould et al. | | |
| 6,732,098 B1 * | 5/2004 | Wakefield | ......... | G06F 17/30684 |
| 6,738,765 B1 * | 5/2004 | Wakefield | ......... | G06F 17/30595 |
| 6,823,325 B1 * | 11/2004 | Davies | ................. | G06F 17/271 706/50 |
| 7,027,974 B1 * | 4/2006 | Busch | ................. | G06F 17/271 704/4 |
| 7,171,349 B1 * | 1/2007 | Wakefield | ......... | G06F 17/30619 704/9 |
| 7,191,117 B2 | 3/2007 | Kirby et al. | | |
| 7,861,163 B2 | 12/2010 | Walker | | |
| 2002/0013793 A1 * | 1/2002 | Bergan | ................. | G06F 17/2785 715/234 |
| 2003/0043213 A1 | 3/2003 | Finley, Jr. et al. | | |
| 2003/0125929 A1 * | 7/2003 | Bergstraesser | ...... | G06F 17/2735 704/9 |
| 2003/0182102 A1 * | 9/2003 | Corston-Oliver | ... | G06F 17/2881 704/9 |
| 2003/0191627 A1 * | 10/2003 | Au | ...................... | G06F 17/2785 704/9 |
| 2004/0093220 A1 | 5/2004 | Kirby et al. | | |
| 2005/0015238 A1 | 1/2005 | Meliksetian et al. | | |
| 2005/0091036 A1 * | 4/2005 | Shackleton | ........... | G06F 17/271 704/9 |
| 2005/0108001 A1 | 5/2005 | Aarskog | | |
| 2006/0184476 A1 * | 8/2006 | Kemper | ............... | G06F 17/3043 706/20 |
| 2006/0230071 A1 * | 10/2006 | Kass | ................ | G06F 17/30539 |
| 2007/0083359 A1 | 4/2007 | Bender | | |
| 2007/0219773 A1 * | 9/2007 | Roux | ...................... | G06F 17/27 704/1 |
| 2007/0294644 A1 | 12/2007 | Yost | | |
| 2008/0195379 A1 * | 8/2008 | Vanderwold | .......... | G06F 17/274 704/9 |
| 2008/0221869 A1 * | 9/2008 | Johnson | ................ | G06F 17/271 704/9 |
| 2010/0198592 A1 * | 8/2010 | Potter | ..................... | G10L 15/20 704/233 |
| 2010/0281385 A1 | 11/2010 | Meaney et al. | | |
| 2011/0307435 A1 * | 12/2011 | Overell | ................. | G06F 17/278 706/46 |
| 2012/0078906 A1 * | 3/2012 | Anand | .............. | G06F 17/30702 707/737 |
| 2012/0272206 A1 * | 10/2012 | Sengupta | ............ | G06F 17/2705 717/101 |
| 2012/0290288 A1 * | 11/2012 | Ait-Mokhtar | ......... | G06F 17/271 704/9 |
| 2013/0021346 A1 * | 1/2013 | Terman | .................... | G09B 5/08 345/467 |

FOREIGN PATENT DOCUMENTS

| | | |
|---|---|---|
| CN | 101661494 | 3/2010 |
| CN | 102354318 | 2/2012 |

OTHER PUBLICATIONS

First Chinese Office Action for Chinese Serial No. 201380066610.5 dated Feb. 28, 2017 (6 pages).
Bird, NLTK; The Natural Language Toolkit, 2006, ACL, Proceedings of COLING/ACL on Interactive Presentation Sessions, pp. 69-72.
International Search Report and Written Opinion dated May 1, 2014 for PCT/US13/66635 (8 pages).

\* cited by examiner

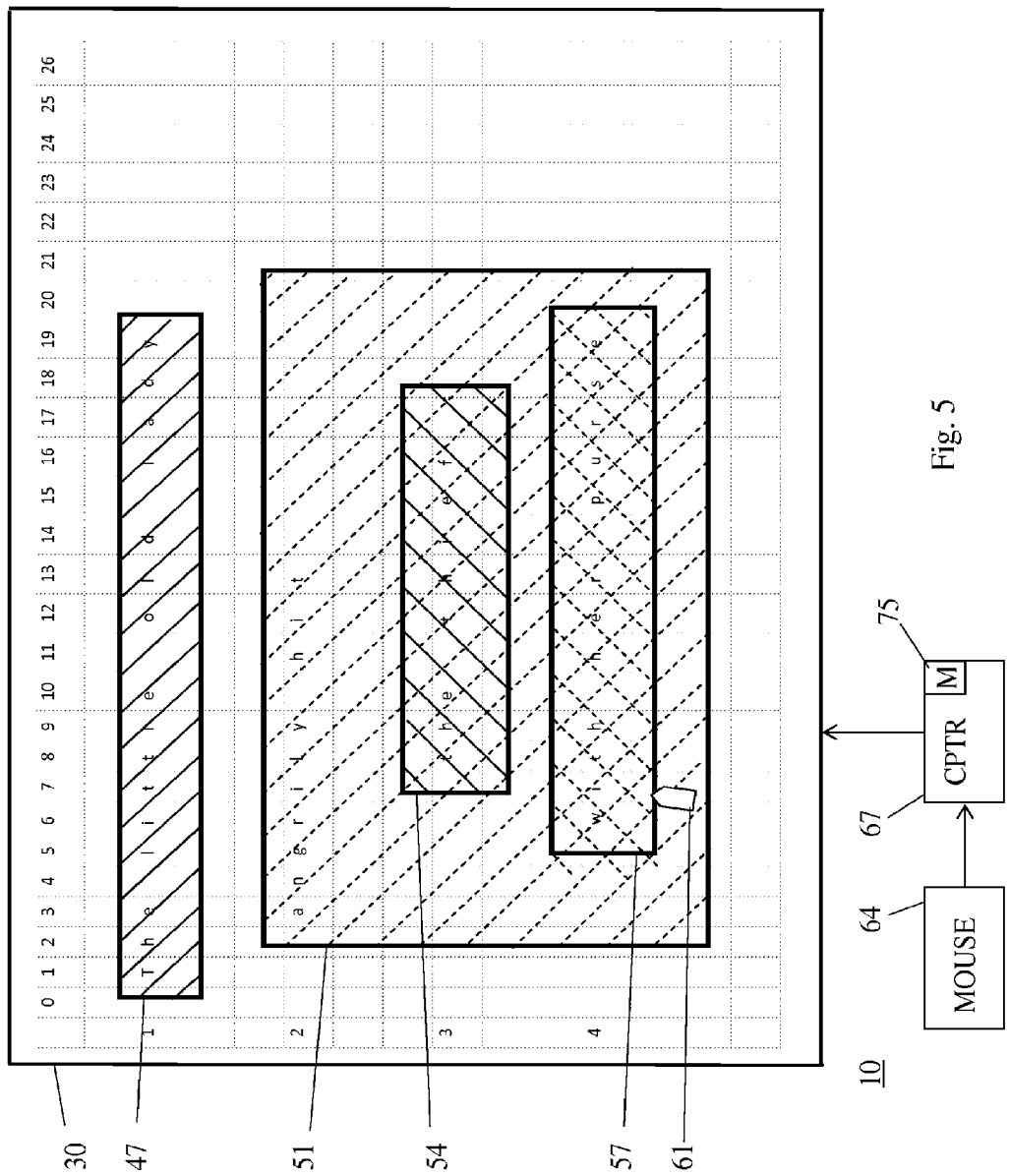

SENTENCE PARSING CORRECTION SYSTEM

CLAIM OF PRIORITY FROM PREVIOUSLY FILED APPLICATION

This is a continuation of U.S. patent application Ser. No. 14/438,311, filed Apr. 24, 2015, which is an international application filed under 35 U.S.C. § 363 claiming priority, under 35 U.S.C. § 119(e)(1), of provisional application Ser. No. 61/718,553, previously filed on 25 Oct. 2012, under 35 U.S.C. § 111(b).

BACKGROUND OF THE INVENTION

Automated sentence parsing has many purposes, from translation from one language to another, to voice recognition. "Parsing" involves dividing a sentence into its constituent phrases: noun phrases, verb phrases, and prepositional phrases. One definition of a phrase is a group of one or more words that form a constituent and so function as a single unit in the syntax of a sentence. A phrase will always include the title part of speech, and often other words as well. Any phrase can in general include other phrases, i.e. nested phrases.

Phrases may be combined into clauses. One or more clauses may be combined into a sentence. A sentence can be defined in orthographic terms alone, i.e., as anything which is contained between a capital letter and a full stop (period). A clause may or may not include a noun, verb, and object which usually but not always a sentence will have.

A particular issue in such parsing is resolving ambiguities. Consider the sentence, "The little old lady angrily hit the thief with her purse." This sentence could mean, "The old lady used her purse to hit the thief," or it could mean, "The old lady hit the thief that had her purse." These are very different meanings of course.

Automated parsing cannot at this time, easily resolve these ambiguities. Indeed, even a human cannot always do so, although by referencing adjacent sentences or even the entire text, a human may often be able to make an educated or even a very accurate guess.

If the previous sentence to the one above had been for example "An old lady was walking down the street carrying a baseball bat and her purse." a human will accurately assume that the old lady hit the thief with the baseball bat. On the other hand, if the trailing sentence read "The thief fell to the ground and the old lady walked on, never having lost her purse" then it's safe to assume that she had hit the thief with her purse.

Systems described in the applicant's previous patents use algorithms that produce quite accurate parsing. These patents include U.S. Patent Nos.:

U.S. Pat. No. 5,802,533 issued Sep. 1, 1998
U.S. Pat. No. 6,279,017 issued Aug. 21, 2001
U.S. Pat. No. 7,036,075 issued Apr. 25, 2006
U.S. Pat. No. 7,765,471 issued Jul. 27, 2010
U.S. Pat. No. 7,861,163 issued Dec. 28, 2010

These algorithms produce hierarchical lists that parse each sentence in the text by the constituent clauses. In cases where it is important to parse the sentences very accurately, and it is possible to delay the final listing to allow human input to correct any possible errors, these lists can be corrected by direct human editing. If the parsing is part of a system for real time translation for example, then human input is not possible.

The hierarchical lists may be quite complex. In common with all text-based presentations of information, such lists are easy to misunderstand, and difficult to accurately review for error. A human reviewing such lists will typically lose focus after a time, and either fail to accurately correct a list having an error, or even miss the error completely. Accordingly, a system that displays the sentence structures in a way that is more graphical and less textual may well allow more accurate correction of such lists.

BRIEF DESCRIPTION OF THE INVENTION

A system for improved sentence parsing has a computer, a display screen receiving display signals from the computer forming a plurality of display objects on the screen and a cursor image on the screen, and a cursor control element for control by a user. The cursor control element may be a computer mouse for example.

The cursor control element provides a cursor control signal to the computer specifying the position of the cursor on the screen, and a cursor action signal having attach and detach states allowing a user to respectively attach an underlying object to the cursor and to detach the cursor from the underlying object. The object is movable with the cursor during the attach state of the cursor action signal. Detaching the object from the cursor responsive to the detach state of the cursor control signal drops the underlying object in the current position.

The computer receiving an input sentence signal encoding the characters comprising a sentence, and provides according to a preselected parsing algorithm, an initial parsed sentence signal encoding an initial parsed version of the noun, verb, and prepositional phrases of the sentence. In some instances however, the initial parsed version is not sufficiently accurate. The invention provides a means to assist a proofreader in addressing this.

The computer first configures as a display element receiving the initial parsed sentence signal, and producing a parsed image display signal for the display screen. The parsed image display signal created on the display screen shows the sentence text arranged in original order, and having on successive lines, the noun, verb, and prepositional phrases of the sentence with indentations or horizontal offsets specifying the relationships among them.

The computer then configures as a format element receiving the parsed sentence signal that creates an excon image for each phrase in the sentence in an expandable container (excon) format. Each of these images includes the phrase and a decoration unique to that phrase. The format element then encodes the excon images in an excon format signal defining the shape of each excon image and an initial topologic relationship of each excon image to the other excon images specifying the initial parsing.

Finally, the computer configures as a correction element receiving the excon format signal and the cursor control and action signals, and responsive thereto attaches the cursor to an excon image. The user then manipulates the cursor control element to move the cursor and the excon image.

Once the excon image is positioned as the user wishes, the user detaches the cursor from the excon image, leaving the excon image at the desired location. While the cursor moves, the correction element provides a display signal creating an image following said attaching, moving, and detaching activities. Responsive to the change from the attach to the detach state of the cursor action signal, the correction element produces a final parsed image display signal creating on the display screen a final topologic relationship of each excon image to the other excon images specifying the altered parsing. The sentence text encoded in the final parsed image display signal has on successive lines, the noun, verb, and prepositional phrases of the sentence with indentations indicating the final parsing.

The decoration in this system may comprise a pattern within the excon through which the phrase is visible. For example, the pattern may comprise lines visible on the display screen. Each line within an excon image may be of a similar type and spaced from the other lines within that excon image. The lines within at least one excon image may be solid, and the lines within another excon image may be dashed.

The format element preferably includes a line merge element, wherein an area on the display screen defined by two overlapping excon images, displays the lines unique to the two overlapping excon images.

In another version, the decoration comprises a color through which the phrase is readable. The format element in this version preferably includes a color merge element, wherein an area on the display screen defined by two overlapping excon images, displays a color different from the colors unique to the two overlapping excon images. The color in the area on the display screen defined by two overlapping excon images, may have a spectral relationship to each of the colors in the two overlapping excon images.

The correction element may be of the type that issues a signal specifying the indentation of the text within an excon image attached to the cursor responsive to the detach state of the signal. The correction element may issue a display signal that changes the dimensions of at least one excon image responsive to the cursor control and action signals.

The computer may further configure as a conversion element receiving the final parsed image display signal and converting same into sets of mark-up tags in a linear text listing for the original sentence. The conversion element then encodes the sets of mark-up tags into a final meta-tag listing signal.

BRIEF DESCRIPTION OF THE DRAWINGS

FIG. 5 shows the block diagram of the computer system of FIG. 2, with the display on the screen showing a final stage of improving the parsing of the sample sentence using the invention as an aid.

DESCRIPTION OF THE PREFERRED EMBODIMENTS

Figure 1:
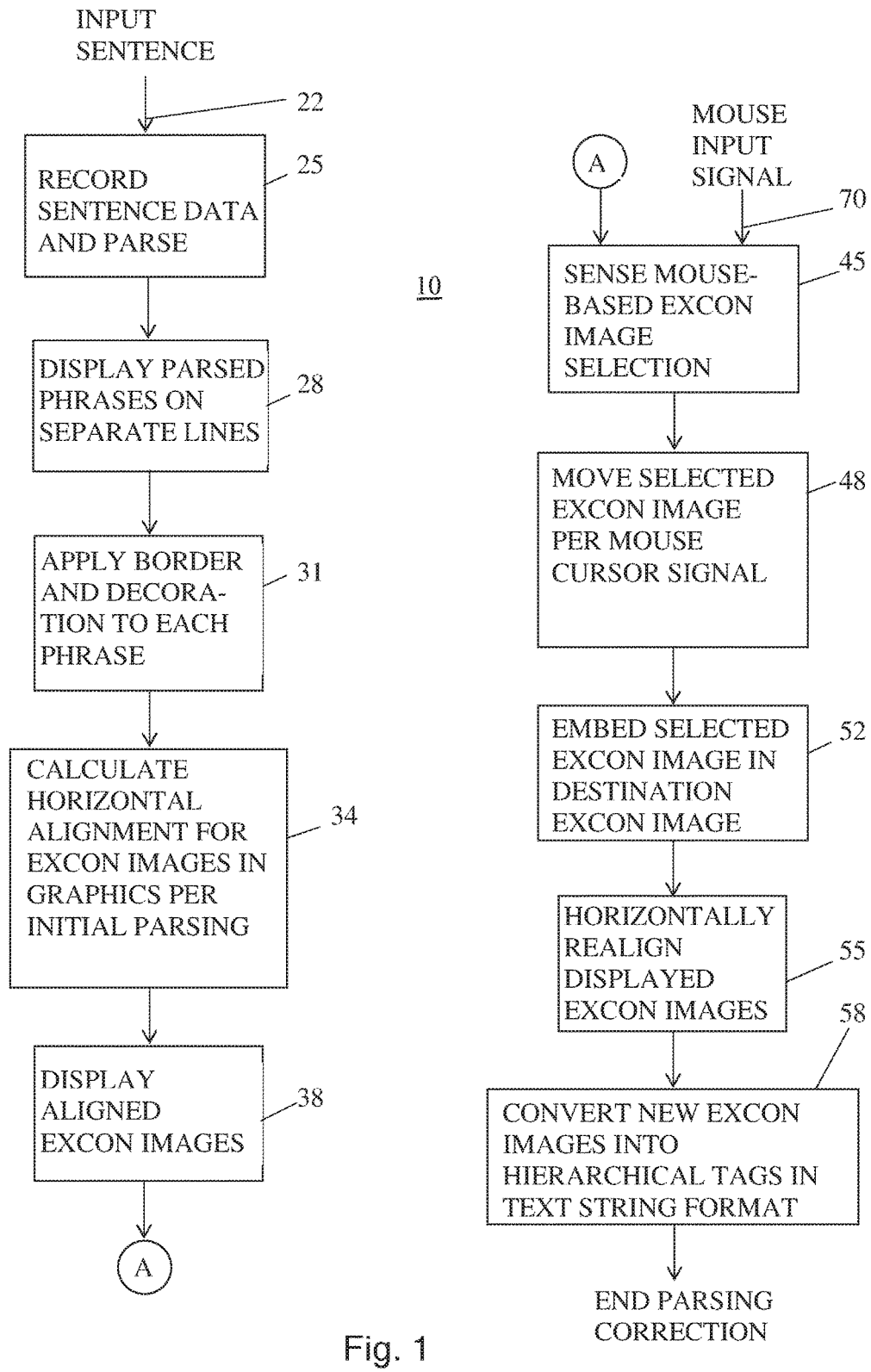
FIG. 1 is a block diagram of functional elements that comprises the invention.

FIG. 1 shows a block diagram of a system 10 that a user employs to a corrected graphical image of a parsed sentence. The intent is to allow a user to arrange and rearrange individual phrases after machine parsing to more accurately reflect the intended meaning of the sentence without altering the original order of the sentence phrases.

Applicant should at this time address the issue of "software" inventions. Contrary to the belief of some, inventions based on software or firmware do have a physical structure. When software designed to implement an invention is loaded into a microprocessor or other type of instruction processor and then executed, the instruction processor literally becomes a machine different from before the instructions are loaded and executed.

The instructions of the invention cause the individual electrical components (logic gates, conductors, amplifiers, memory elements, clocks, etc.) of the instruction processor to interact in ways not possible before the instructions are executed. These components receive and send signals on the conductors that are different from the signals received and sent by these components prior to executing the invention's software. The software of the invention causes the various instruction processor components to cooperate and interact to form the functional elements that comprise the invention. As the instruction execution proceeds, individual ones of these components may at different times form parts of two or more of these functional elements.

It is true that one cannot directly see the individual components of the instruction processor where the invention's instructions execute. These components are buried deeply within the microchip forming the instruction processor. In any case, these components are for the most part literally microns in physical size or even smaller. Nor can one directly measure the signals that the instruction processor's components receive and send while serving as the invention's functional elements.

But nothing in patent law requires the components of an invention to be visible. Nothing in patent law forbids a single component from serving as a part of two or more functional elements of an invention. Nor does the patent law require that signals produced by a component of the invention as defined by the claims be humanly detectable.

Thus, it is completely appropriate to consider software as creating an invention that comprises a group of functional elements. These functional elements are physical structure temporarily created within the instruction processor by the execution of the software of the invention. The signals that the functional elements send and receive form the functional relationships among the functional elements. The instruction processor when executing the invention's software becomes in effect, special purpose hardware, literally, the invention itself.

In every such case, one could at greater expense, design and build hardware that precisely recreates a "software" invention. But why would one wish to pursue such an expensive approach, when software accomplishes the same result at a fraction of the cost? That being the case, why would the law deny an inventor a patent most efficiently implemented as software or firmware executing within an instruction processor rather than as hardware? Common sense and fairness requires that software be treated in the same way that hardware is treated.

Now it is possible that in some cases, a human with a calculator or pencil and paper can perform the operations that the invention performs. Applicant does not intend to burden any such human endeavor. In most cases, it will take this hypothetical human years to perform the same calculations that the software does in milliseconds. Applicant will not in any way use a patent to impede such a person wishing to recreate the invention's functions manually.

FIGS. 2-5 show a display screen 30 forming a part of system 10. FIGS. 2-5 show a series of images that represent screen captures for a system 10 that embodies the invention.

System 10 includes a computer 67 that provides video signals to display screen 30. A mouse 64 allows a user to control the position of a cursor 61 on screen 30, see FIGS. 4 and 5. A memory element M at 75 receives input data signals and records the data encoded therein under control of software. Recorded data can be retrieved in output data signals. All of these components are conventional. And of course, computer 67 includes other components conventionally found in modern personal computers, such as a keyboard and communication with external devices.

Screen 30 in FIGS. 2-5 displays images of typical screen captures showing how the system 10 responds as a user corrects an original machine parsing. In this discussion it is convenient to use the same ambiguous sentence discussed in the Background section: "The little old lady angrily hit the thief with her purse."

In FIG. 1, a sentence to be parsed is encoded in a initial sentence signal carried on signal path 22. Sources for this signal might include a keyboard connected to computer 67, an external memory that has previously recorded text to be parsed, etc.

Figure 2:
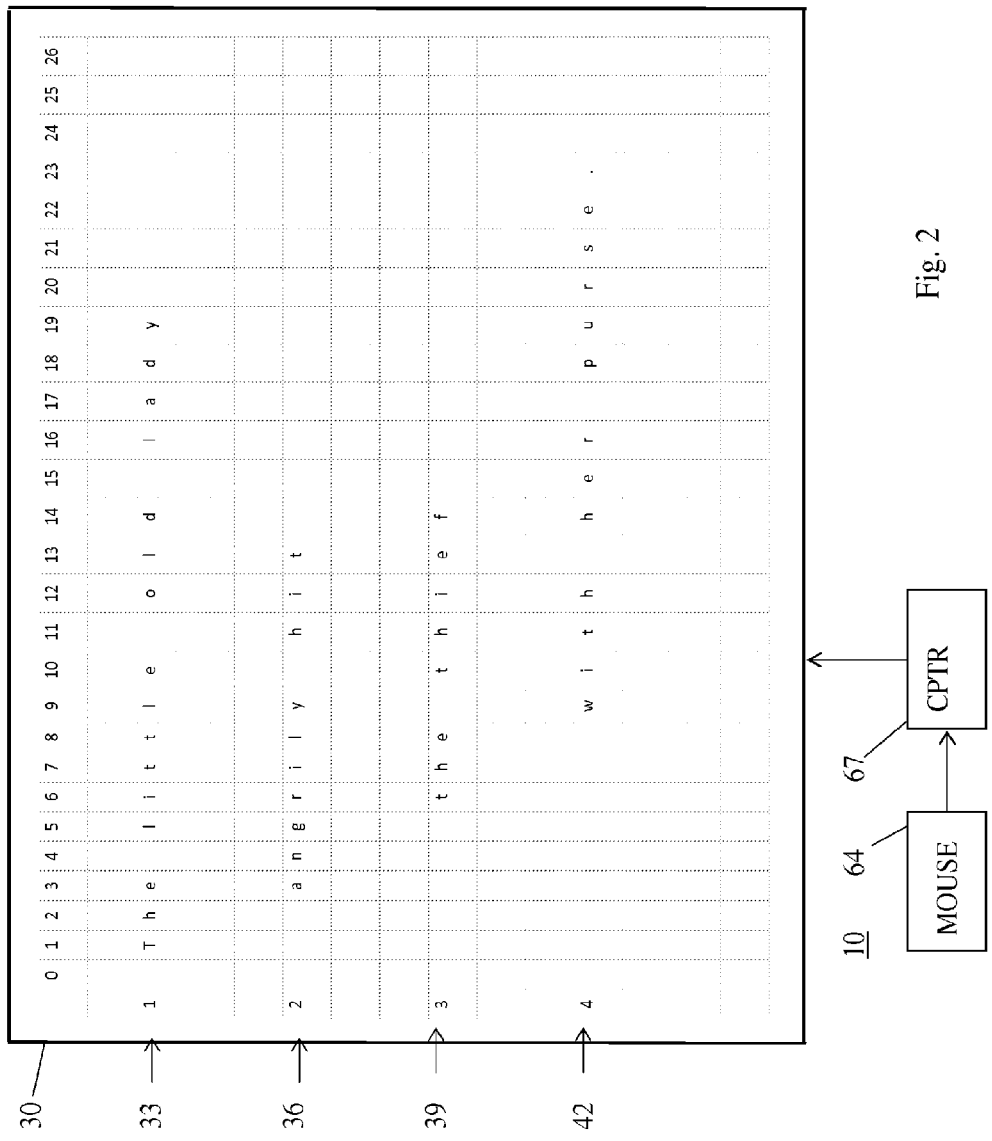
FIG. 2 is a block diagram of a computer system, including a display on a screen showing an initial parsing of a sample sentence.

FIG. 2 shows a functional element 25 that records the sentence encoded in the signal on path 22 in memory element 75. Element 25 then proceeds to parse the phrases in the sentence. The eventual result of this parsing might be Meta-Tag Listing 1:

Meta-Tag Listing 1
<S><N>P1_The little old lady</NP><VP><V1>P2_angrily hit</V1><NP>P3_the thief><PP>P5_with her purse</PP></NP></VP>.</S>

Computer 67 generates a signal storing this initial parsing string in memory 75. In the initial parsing string, the individual tags have the following meanings:

<XX> and </XX>—starting and finishing separators for a parsing tag
S—start of a sentence
N—noun
P1, P2, etc.—phrase indicator
VP—verb phrase
PP—prepositional phrase
/—end of the indicated character string
Horizontal Positioning Functional element 28 receives an input sentence signal encoding the characters comprising a sentence, and providing according to an preselected parsing algorithm, a parsed sentence signal encoding a parsed version of the noun, verb, and prepositional phrases of the sentence. Initial layout designation for the position of the first word of each phrase might be as follows. Add two spaces for a new equal hierarchy, e.g., noun and verb of same phrase; add three spaces for each hierarchical level tag within another hierarchy; when multiple equivalent hierarchies exist within a larger hierarchy, start with the most distal segment and add two spaces for each proximal segment.

This processing produces the following meta-tag listing shown in Table 1 for the example sentence:

TABLE 1

| | Horiz. Offset | Phrase | |
| --- | --- | --- | --- |
| <S> | | | |
| <NP>P1_ | (x=1) | The little old lady | </NP> |
| <VP>P2_ | (1+2=3) | angrily hit | |

TABLE 1-continued

| | Horiz. Offset | Phrase |
| --- | --- | --- |
| <VP-NP>P3_ | (1+2+3=6) | the thief |
| <VP-NP-PP>P4_ | (1+2+3+3=9) | with her purse. |
| </PP> </NP> </V> | | |
| </S>. | | |

The horizontal offsets (indentations) are determined by assigning each noun phrase (NP) an offset of 1, and each verb phrase and prepositional phrase an offset of 3. The values for these horizontal offsets in Table 1 correspond to the columns (values for x) in which the first letter of the first word of the phrase is placed in FIG. 2. These offsets are cumulative. The purpose of this arrangement is to provide the user with clearer access to the individual phrases.

The display 30 in FIG. 2 reflects this organization, with the individual phrases indicated as 33, 36, 39, and 42. Note that the horizontal offset of each phrase's beginning letter in FIG. 2 corresponds to the horizontal offset indicated above.

Functional element 31 receives the signal encoding the screen pattern of FIG. 2 and creates closed containers 47, 51, 54, and 57 respectively enclosing the individual phrases texts 33, 36, 39, and 42. Containers 47, 51, 54, and 57 are similar to rectangles that users can create using any drawing software such as that forming a part of Microsoft® Word. The software automatically expands or resizes these containers so as to accommodate multiple phrases as the user shifts containers into or out of other containers, in a way similar to that for changing the size of objects with common drawing software. It is convenient to use a shorthand term of "excon image" or simply "excon" to refer to these expandable or resizable text containers.

While not shown on screen 30, it should be understood that each sentence that undergoes this alteration is placed within the text from which it originally was selected. This allows a user to quickly grasp the context for the sentence while reviewing the initial parsing for accuracy.

Display screen 30 receives display signals from the computer 67 that cause the display of the excon images 47, 51, 54, and 57 and a cursor image 61 on screen 30. A cursor control element such as mouse 64 is for user control of the cursor. As a user manipulates it, mouse 64 provides a cursor control signal to the computer 67 specifying the position of the cursor image 61.

Mouse 64 also has a button on it under control of the user, that provides a cursor action signal having attach and detach states to attach and release the cursor image 61 to an object such as one of the excon images 47, 51, 54, and 57 underlying the cursor image 61. The underlying excon 47, 51, 54, and 57 is movable with the cursor image 61 as specified by the cursor control signal during the attach state of the cursor action signal. The detach state of the cursor action signal releases the excon image 47, 51, 54, and 57 in its current position.

A user can thus change the excon images 47, 51, 54, and 57 positions using the mouse 64 and the button on it to control cursor 61 (see FIGS. 4 and 5) which attaches to the excon image involved. In the same way, a user can change the size of an excon image 47, 51, 54, and 57 to accommodate more (or fewer) phrases as a user wishes.

It is also convenient to give excon images 47, 51, 54, and 57 a wallpaper or background pattern called hereafter a decoration, to assist a user when rearranging the containers during parsing correction. In the system shown, the decorations comprise parallel diagonal lines of various types so as to distinguish overlapping or overlying of some containers on others. The patterns should have transparency so that the text and wallpaper patterns are discernable regardless of the number of overlying containers in a particular area.

Figure 3:
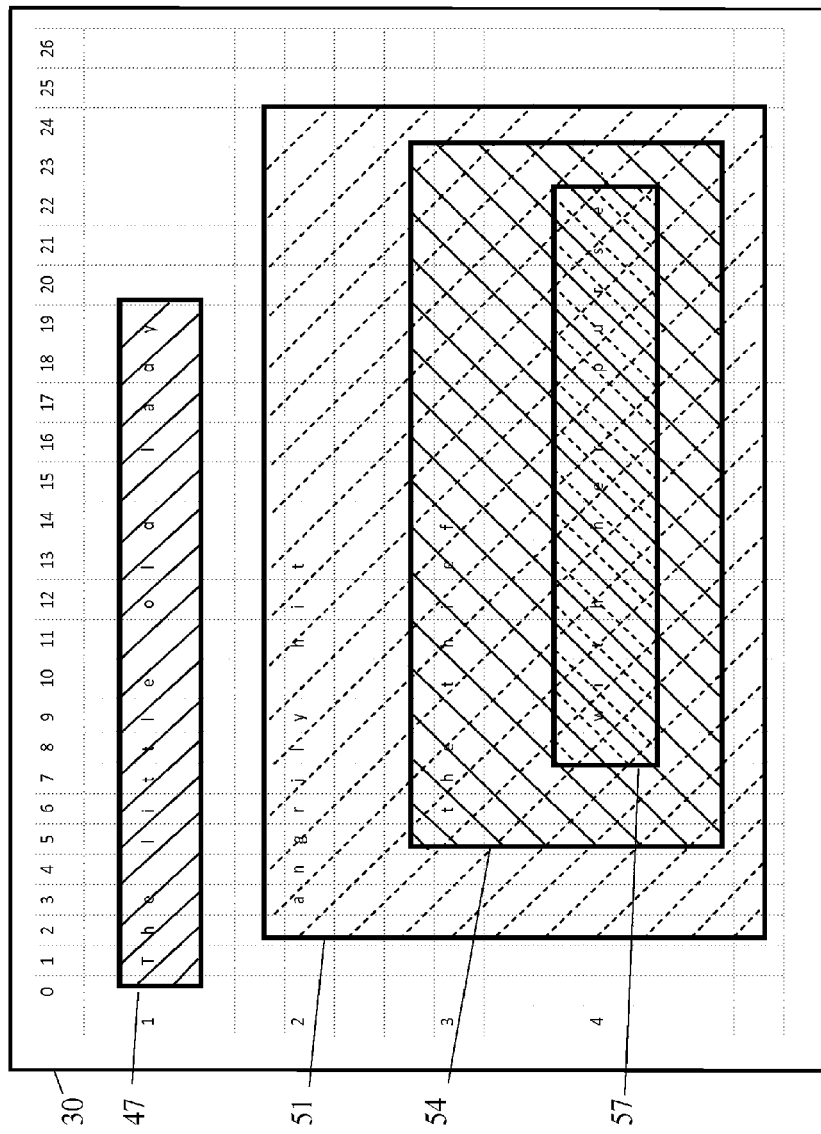
FIG. 3 shows the block diagram of the computer system of FIG. 2, with the display on the screen showing a first stage of improving the parsing of the sample sentence using the invention as an aid.

Referring to FIG. 3, one can see that excon image 57 has southwest to northeast dotted line diagonals overlying the southwest to northeast solid line diagonals of excon image 54 and the northwest to southeast dotted line diagonals of excon image 51. The transparency feature of each container's background pattern allows the other excons' patterns and the text within them to be clearly visible. At the same time, each pattern is easily associated with its excon images 47, 51, 54, or 57.

In another version, the decorations may have various distinctive colors. The computer 67 may comprise a color merging element causing individual colors within individual excon images to blend or merge to create other distinctive colors that a user will quickly learn to identify as having a particular meaning. One can in fact, consider the individual line patterns as proxies for color fills or patterns. The color fills should in the coloration version as well, have transparency sufficient to allow the user to see the text held within the excon involved. Of course, both colors and line patterns can be present simultaneously within a particular excon.

In one version, the colors for colored overlapping excon images blend to create a new color spectrally related to the colors in the two overlapping images. The line patterns where excon images 54 and 57 overlap for example, symbolize such a spectral relationship.

Functional element 34 receives the signals defining the excon images 47, 51, 54, and 57 from functional element 31 and computes the appropriate horizontal offsets for the phrases as discussed in Table 1 above. Element 34 then transmits a signal encoding these offsets to a functional element 38. Functional element 38 processes the offsets signal and transmits a positioning signal to the display screen 30 that properly aligns the individual excon images 47, 51, 54, and 57.

Functional element 38 activates functional element 45. As the user shifts the position of mouse 64 and presses its control buttons, mouse operation signals flow to element 45, which then transmits these signals to screen 30. These signals cause the position of cursor 61 (FIGS. 4 and 5) to shift in accordance with mouse 64 movement.

Parsing Correction

In a manner identical to that for grabbing and shifting the position of any displayed object under control of a computer operating system, functional element 48 allows the user to use a mouse 64 button to lock cursor onto an excon image 47, 51, 54, or 57 and then shift the excon image as the user desires.

Figure 4:
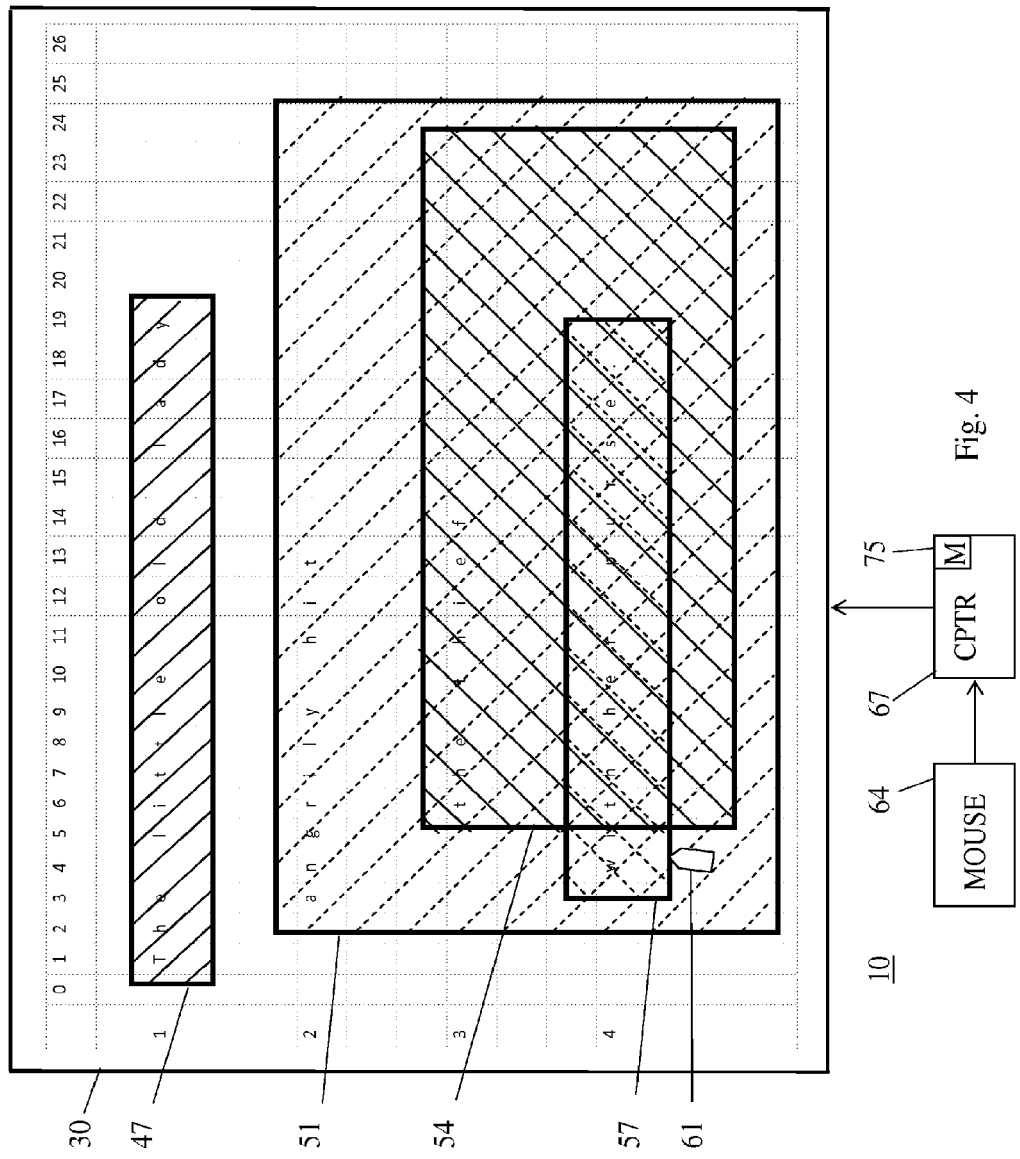
FIG. 4 shows the block diagram of the computer system of FIG. 2, with the display on the screen showing a second stage of improving the parsing of the sample sentence using the invention as an aid.

Referring to FIG. 4, the user has locked cursor 61 onto excon image 57 by pressing the mouse 64 button to issue the cursor action signal with the attach state and is in the process of removing excon image 57 from excon image 54. Note that the decoration for excon image 57 that is outside of excon image 54 is different from that inside excon image 54.

In one embodiment, when the user moves an excon image that is enclosed by another excon image partially outside of the enclosing excon image, the enclosing excon image automatically resizes by contracting. Thus, the user can move excon image 57 entirely outside of excon image 54 and place excon image 57 within excon image 51. In one embodiment, moving excon image 57 partially outside excon image 54 causes excon image 54 to resize by contracting vertically, to thereby create space for excon image 57 within excon 51, as shown in FIG. 5.

Functional element 48 from the mouse signals during cursor 61 movement, derives a signal encoding the new position of excon image 57. When the user releases the mouse button that attached cursor 61 onto excon image 57, the cursor action signal returns to the detach state. Excon image 57 then remains in the position.

Functional element 52 then resizes excon images 51 and 54 to make room for excon image 57 as FIG. 5 shows. Functional element 55 also responds to the detach state of the cursor action signal and the new parsing arrangement to recalculate a new horizontal (offset) alignment for the texts in excon images 54 and 57.

After this repositioning and resizing of excons 54 and 57, screen 30 displays a parsing as (presumably) improved by the user, and issues a final parsing signal encoding the new arrangement. The display of excon 57 outside of the excon 54 and in horizontal alignment between excons 51 and 54 symbolizes the meaning of the sentence that the user determines to be more proper.

Functional element 58 receives the final parsing signal and converts the new parsing arrangement that the excon images represent into the meta-tag listing of the meta-tags, horizontal offsets, and phrases shown in Table 2.

The values for these horizontal offsets in Table 2, below, correspond to the column (values for x) in which the first letter of the first word of the phrase, inside the excon, is placed in FIG. 5.

TABLE 2

|  | Horiz. Offset | Phrase |  |
| --- | --- | --- | --- |
| <S> |  |  |  |
| <NP>P1_ | (x=1) | The little old lady | </NP> |
| <VP>P2_ | (1+2=3) | angrily hit |  |
| <VP-NP>P3_ | (1+2+4=7) | the thief | </NP> |
| <VP-PP>P4_ | (1+2+4−2=5) | with her purse. |  |
| </PP> </V> </S>. |  |  |  |

The x-value for P4 now shows (1+2+4−2=5) to denote that P4 has been moved to the left of P3, and that the horizontal offset of P4 is now 2 columns less than the horizontal offset for P3. The drawing in FIG. 5 also has a slight shift in the x-value of P3 (=7), compared to its value in FIG. 2 (where it had been=6); this is the result of rules in the excon positioning algorithm, in which an excon that has had one of its internal excons taken out of it, (such as the excon for P4 being pulled out of the excon for P3), will automatically add an extra column value to the excon that had previously been containing the other, bumping it over to the right slightly. This adds more spatial differentiation to the layout, for greater clarity in the user's inspection of column assignments of each phrase-head.

Element 58 then converts Table 2 into the text string shown in Listing 2 with revised hierarchical tags using the offsets from Table 2:

Meta-Tag Listing 2

<S><NP>P1_The little old lady</NP> <VP><V1>P2_angrily hit</V1><NP>P3_the thief> </NP><PP>P5_with her purse</PP></VP>.</S>

This listing is then encoded in a final meta-tag listing signal and supplied for further processing to the parsing system of which this invention forms a part. The final meta-tag listing signal may be used for such things as improved translation and voice synthesization. This tool is also useful in assisting an editor or proofreader in detecting potential ambiguities and faulty syntax, which the author or editor may then correct.

The invention claimed is:

1. A sentence parsing correction system comprising a computer processor, a display operatively linked therewith, and a user action element to effectuate select user actions in relation to display objects of said display, via user control and action signals, said computer processor receiving an input sentence signal encoding characters comprising a sentence and generating therefrom a meta-tag listing of text of the sentence and providing, according to a preselected parsing algorithm, an initial meta-tag listing signal encoding a parsed version of a noun, a verb, and phrases of the sentence, said computer processor selectively configurable as a display element in furtherance of receiving said initial meta-tag listing signal, and producing a parsed image display signal for displaying upon said display, said parsed image display signal displayed upon said display such that the text of the sentence is arranged in original text order, and has, on successive lines, the noun, the verb, and phrases of the sentence with indentations specifying parsing relationships among them, said computer processor further selectively configurable as a format element in furtherance of receiving said parsed image display signal, and creating a unique expandable container image for each phrase of the phrases of the sentence in an expandable container format, said expandable container format encoded in an expandable container format signal, said computer further selectively configurable as a correction element in furtherance of receiving said expandable container format signal and said user control and action signals, selecting a display object of said display objects wherein said display object comprises a unique expandable container image of a phrase of the phrases of the sentence, and altering a property of said display object and/or a relationship for said display object relative to other display objects and thereafter providing a display signal creating an image in furtherance of producing a final parsed image display signal creating on said display an altered parsing characterized by a topology for and between each unique expandable container image relative to other unique expandable container images wherein the sentence text has, on successive lines, the noun, the verb, and prepositional phrases of the sentence with indentations specifying the altered parsing.

2. The system of claim 1 wherein said unique expandable container image includes the phrase and a decoration.

3. The system of claim 2 wherein the decoration comprises a pattern through which the phrase is visible.

4. The system of claim 3 wherein the pattern comprises lines visible on the display screen, each line within an expandable container image of a similar type and spaced from the other lines within that expandable container image.

5. The system of claim 4 wherein the lines within at least one expandable container image are solid and the lines within another expandable container image are dashed.

6. The system of claim 5 wherein said format element includes a line merge element wherein an area on the display screen defined by two overlapping expandable container images displays the lines unique to the two overlapping expandable container images.

7. The system of claim 2 wherein said decoration comprises a color through which the phrase is readable.

8. The system of claim 7 wherein said format element includes a color merge element wherein an area on the display defined by two overlapping expandable container images displays a color different from the colors unique to the two overlapping expandable container images.

9. The system of claim 8 wherein the color in the area on the display defined by two overlapping expandable container images has a spectral relationship to each of the colors in the two overlapping expandable container images.

10. The system of claim 1 wherein said expandable container format signal delimits a shape of each expandable container image.

11. The system of claim 1 wherein said expandable container format signal delimits a topologic relationship of/for each expandable container image relative to other expandable container images specifying the initial parsing.

12. The system of claim 1 wherein said expandable container format signal delimits a shape of each expandable container image and a topologic relationship of/for each expandable container image relative to other expandable container images specifying the initial parsing.

13. The system of claim 12 wherein said unique expandable container image includes the phrase and a decoration.

14. The system of claim 13 wherein said decoration comprises a pattern through which the phrase is visible.

15. The system of claim 14 wherein said pattern comprises lines visible on the display screen, each line within an expandable container image of a similar type and spaced from the other lines within that expandable container image.

16. The system of claim 15 wherein the lines within at least one expandable container image are solid and the lines within another expandable container image are dashed.

17. The system of claim 16 wherein said format element includes a line merge element wherein an area on the display screen defined by two overlapping expandable container images displays the lines unique to the two overlapping expandable container images.

18. The system of claim 13 wherein the decoration comprises a color through which the phrase is readable.

19. The system of claim 18 wherein said format element includes a color merge element wherein an area on the display screen defined by two overlapping expandable container images displays a color different from the colors unique to the two overlapping expandable container images.

20. The system of claim 19 wherein the color in the area on the display screen defined by two overlapping expandable container images has a spectral relationship to each of the colors in the two overlapping expandable container images.

21. The system of claim 1 wherein said correction element issues a display signal resizing the dimensions of at least one expandable container image responsive to the user control and action signals.

22. The system of claim 1 wherein said computer processor is further selectively configurable as a conversion element receiving the final parsed image display signal and converting said signal into sets of mark-up tags in a linear text listing for the original sentence, and encoding the sets of mark-up tags into a final meta-tag listing signal.

23. A system for improved sentence parsing having a computer, a display screen receiving display signals from the computer forming a plurality of display objects on the screen and a cursor image on the screen, and a cursor control element for user control providing i) a cursor control signal to the computer specifying the position of the cursor, and ii) a cursor action signal having attach and detach states to attach and release the cursor to an object underlying the cursor, said underlying object movable with the cursor during the attach state of the cursor action signal, and dropping the object in the current position thereof responsive to the detach state of the cursor action signal, said computer receiving an input sentence signal encoding the characters comprising a sentence and generating therefrom a meta-tag listing of the sentence, and providing according to a preselected parsing algorithm, an initial meta-tag listing signal encoding a parsed version of the noun, verb, and prepositional phrases of the sentence, wherein the computer further comprises:

a) a display element receiving the initial meta-tag listing signal, and producing an initial parsed image display signal for the display screen, said initial parsed image display signal creating on the display screen the sentence text arranged in original order, and having on successive lines, the noun, verb, and prepositional phrases of the sentence with indentations specifying the parsing relationships among them;

b) a format element receiving the parsed sentence signal and creating an expandable container image for each phrase in the sentence in an expandable container (excon) format, each said image including the phrase and a decoration unique to that phrase comprising a pattern through which the phrase is visible, said pattern comprising lines visible on the display screen spaced from the other lines within that excon image, and said pattern of lines different from the pattern of every other displayed excon, and encoding the excon format in an excon format signal defining the shape and decoration of each excon image and an initial topologic relationship of each excon image to the other excon images specifying the initial parsing; and c) a correction element receiving the excon format signal and the cursor control and action signals, and responsive thereto attaching the cursor to an excon image, moving the cursor and the excon image, and then detaching the cursor from the excon image, and providing a display signal creating an image following said attaching, moving, and detaching activities, and responsive to the change from the attach to the detach state of the cursor action signal, producing a final parsed image display signal creating on the display screen a final topologic relationship of each excon image to the other excon images specifying the final parsing, wherein the sentence text has on successive lines, the noun, verb, and prepositional phrases of the sentence with indentations specifying the final parsing, the final parsed image display signal of each correction element, responsive to the detach state of the signal, specifying the indentation of the text within an excon image attached to the cursor, and encoding the excon format in an excon format signal defining the shape of each excon image and an initial topologic relationship of each excon image to the other excon images specifying the initial parsing, and wherein said display signal specifies resized dimensions of at least one excon image responsive to the cursor control and action signals.

* * * * *